United States Patent [19]

Bryant et al.

[11] Patent Number: 5,366,801
[45] Date of Patent: Nov. 22, 1994

[54] FABRIC WITH REVERSIBLE ENHANCED THERMAL PROPERTIES

[75] Inventors: Yvonne G. Bryant, Raleigh; David P. Colvin, Apex, both of N.C.

[73] Assignee: Triangle Research and Development Corporation, Raleigh, N.C.

[21] Appl. No.: 891,236

[22] Filed: May 29, 1992

[51] Int. Cl.$^5$ ............................................. B32B 5/16
[52] U.S. Cl. .......................... 428/283; 428/240; 428/262; 428/265; 428/290; 428/305.5; 428/313.5; 428/321.5; 428/913
[58] Field of Search .................. 428/262, 321.5, 402.2, 428/402.21, 320.2, 321.5, 240, 262, 265, 283, 290, 305.5, 313.5, 321.5, 913; 427/372.2

[56] References Cited

U.S. PATENT DOCUMENTS

| | | | |
|---|---|---|---|
| Re. 32,713 | 7/1988 | Woo | 428/240 |
| 4,020,210 | 4/1977 | Geer | 428/307 |
| 4,102,800 | 7/1978 | Popoff et al. | 252/182 |
| 4,268,069 | 5/1981 | Stolfo | 282/27.5 |
| 4,268,558 | 5/1981 | Boardman | 428/71 |
| 4,504,402 | 3/1985 | Chen et al. | 252/70 |
| 4,587,279 | 5/1986 | Salyer et al. | 523/206 |
| 4,708,812 | 11/1987 | Hatfield | 252/70 |
| 4,738,892 | 4/1988 | Canova | 428/219 |
| 4,756,958 | 7/1988 | Bryant et al. | 428/320.2 |
| 4,774,133 | 9/1988 | Doree et al. | 428/321.5 |
| 4,871,615 | 10/1989 | Vigo et al. | 428/398 |
| 4,990,392 | 2/1991 | Groshens et al. | 428/196 |
| 4,994,317 | 2/1991 | Dugan et al. | 428/246 |

*Primary Examiner*—George F. Lesmes
*Assistant Examiner*—C. Raimund
*Attorney, Agent, or Firm*—Robert G. Rosenthal

[57] ABSTRACT

A coating is adapted to be applied to a fabric in order to enhance the thermal characteristics thereof. The coating includes integral and leak-resistant microcapsules filled with phase change material or plastic crystals that have specific thermal properties at predetermined temperatures.

16 Claims, 1 Drawing Sheet

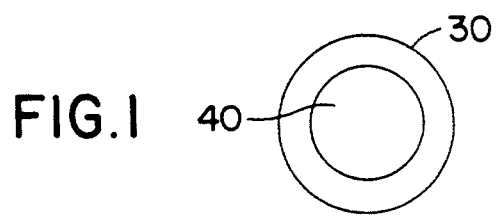
FIG. 1
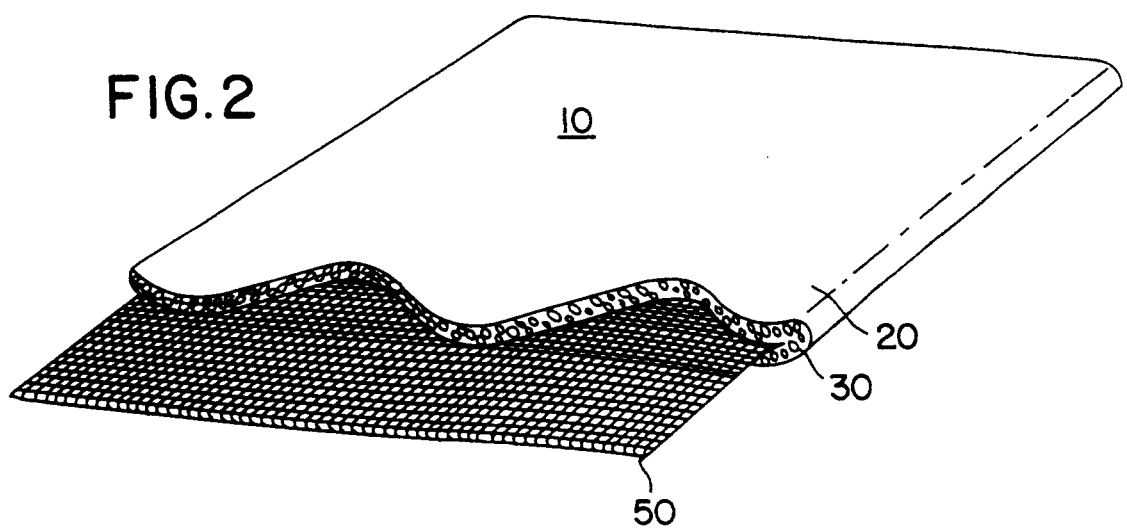
FIG. 2
FIG. 3
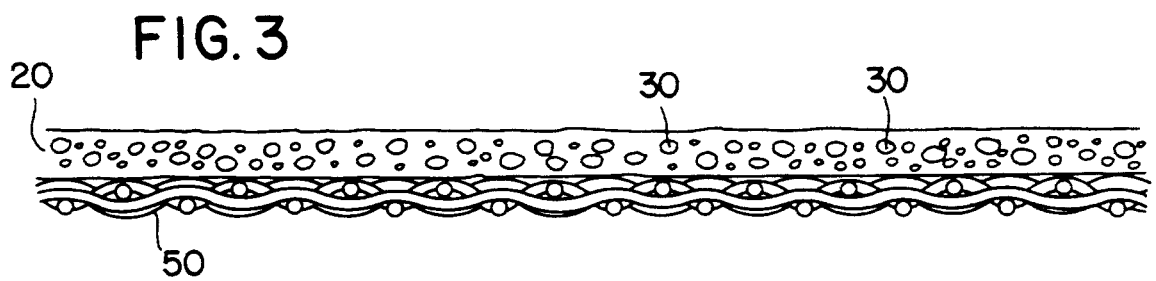
FIG. 4
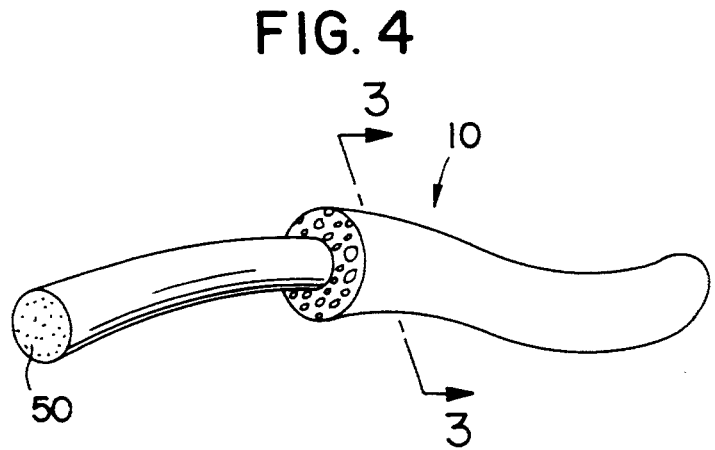
FIG. 5
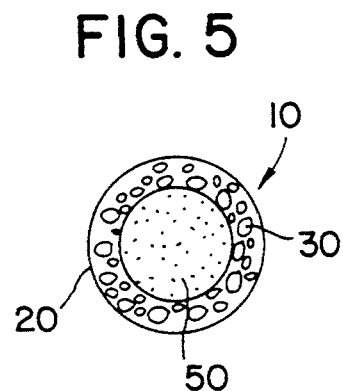

FABRIC WITH REVERSIBLE ENHANCED THERMAL PROPERTIES

FIELD OF THE INVENTION

This invention relates generally to the field of coated fabrics and more particularly to fabrics coated with a binder containing microcapsules filled with energy absorbing phase change material which enables the fabric to exhibit extended or enhanced heat retention or storage properties.

BACKGROUND OF THE INVENTION

The treatment of textiles with various substances in order to change the properties thereof is well known. For example, it is known that textiles may be waterproofed by coating them with natural or synthetic rubber. Substances have been developed which when sprayed onto fabrics introduce the property of stain resistance. Also known is the example of a fragrance delivery system which uses breakable fragrance-filled microcapsules which are attached to the surface of a fabric or fiber and upon the introduction of an external force, the microcapsules break releasing the fragrance over an extended time period.

Other examples of microcapsules being applied to the surface of fabrics for various end-uses are known. U.S. Pat. No. 4,774,133 to Doree et al. discloses a thermoplastic substrate bearing rupturable microcapsules in a binder. The substrate is capable of being softened when heated, and by the application of pressure the microcapsules become partially imbedded in the surface of porous objects such as fabrics. A thermo-adhesive textile product is disclosed in U.S. Pat. No. 4,990,392 and comprises a backing fabric and an adhesive layer deposited on its surface. The adhesive layer comprises a thermo-adhesive polymer and a cross-linking agent which is isolated from the polymer by microencapsulation and which is freed by external action. The present invention differs from the forgoing examples in that the microcapsules contain phase change material and are designed to be an integral and permanent part of a coating applied to a substrate, as opposed to being ruptured during use.

Fabrics have been given enhanced thermal properties by coating the fibers with phase change material and plastic crystals. U.S. Pat. No. 4,871,615 discloses temperature adaptable textile fibers which store heat when the temperature rises and release heat when the temperature decreases, in which phase change or plastic crystalline materials are enclosed within hollow fibers, or impregnated upon non-hollow fibers. The fibers are produced by dissolving the phase change or plastic crystalline materials in a solvent such as water, thereafter filling the hollow fibers, or impregnating the non-hollow fibers, with the solution, followed by removal of the solvent. Alternatively, the phase change materials may be applied to the fibers from a melt rather than a solution.

At the phase change temperature, a characteristic of phase change material during the heating cycle is to absorb and hold a quantity of thermal energy at almost a constant temperature while changing to the next phase. Thus, the material can be precooled and used as a barrier to heat, since a quantity of thermal energy must be absorbed by the phase change material before its temperature can rise. The phase change material may also be preheated and used as a barrier to cold, as a quantity of heat must be removed from the phase change material before its temperature can begin to drop.

However, the durability of the aforementioned surface mounted phase change materials was found to be lacking. While somewhat effective, the fabric lacked repeatability of the thermal response. Each successive laundering removed a portion of the phase change material, thus causing the fabric to exhibit a corresponding change in thermal properties which limited its usefulness and lifetime. As a result, further work was undertaken to perfect a series of process steps for binding the phase change material to the fabric in order to extend the useful life of the enhanced thermal properties. Furthermore, as far as is known to the inventors, these fibers and fabrics have limited usefulness as only a single phase change material may be applied to the substrate which requires that the thermal absorption or release occur at a specific temperature.

It is, therefore, an object of the present invention to provide a substrate coating with enhanced thermal retention properties.

It is another object of the present invention to provide a substrate coating which will maintain its enhanced thermal properties over an extended period of time.

It is another object of the invention to provide a substrate coating having enhanced thermal properties which can be produced with a minimum of process steps.

It is a still further object of the present invention to provide a substrate coating having enhanced thermal properties which can be applied to a fabric from which articles of clothing and the like can be manufactured.

It is a still further object of the present invention to provide a substrate coating which displays enhanced thermal properties over a specified temperature range.

A related object of the present invention is to provide a thermal control material having enhanced thermal storage properties that are reversible.

SUMMARY OF THE INVENTION

The foregoing objects are accomplished by providing a coating adapted to be applied to a substrate such as a fabric for enhancing the thermal storage properties thereof. The coating comprises a polymer binder and a plurality of leak resistant microcapsules, integral with and dispersed throughout the polymer. The microcapsules contain a temperature stabilizing means such as a phase change material. A substrate coated with the object of the present invention exhibits enhanced thermal stability when subjected to heat or cold. The microcapsules are resistant to leakage or rupture and may be subjected to repeated external mechanical stresses with minimum changes in the thermal characteristics of the coated substrate. Additionally, the coating may also include microcapsules containing different preselected phase change materials with different transition temperatures, which increases the range of temperatures over which the coated substrate can be stabilized.

BRIEF DESCRIPTION OF THE DRAWINGS

FIG. 1 is a cross section of a microcapsule according to the present invention containing phase change material.

FIG. 2 is a perspective view of a substrate coated with a polymer coating microcapsule according to the present invention.

FIG. 3 is a sectional view of a substrate coated on one side according to the present invention.

FIG. 4 is another perspective view of a coated substrate according to the present invention.

FIG. 5 is a cross-sectional view of the substrate according to the present invention taken along line 3—3 of FIG. 4.

DETAILED DESCRIPTION OF THE PREFERRED EMBODIMENTS

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

Referring now to the drawings and particularly to FIGS. 2 and 4, the coating generally indicated at 10 comprises a flexible polymer binder 20, with a plurality of microcapsules 30 (FIG. 1) integral and dispersed throughout the polymer binder 20. The microcapsules 30 contain a temperature stabilizing means 40 as will be more fully explained hereinafter.

The polymer binder may take the form of an organic plastic, examples of which include, but are not limited to, polyurethane, nitrile rubbers, chloroprene rubbers, polyvinyl alcohol, silicone, ethylene/vinyl acetate co-polymer, acrylic and the like.

The microcapsules 30 can range in size from about 0.5 to 1,000 microns and are formed according to conventional methods well known to those skilled in the art.

The microcapsules contain a temperature stabilizing means or phase change material 40 such as eicosane. Additionally, plastic crystals such as 2,2-dimethyl-1,3-propanediol (DMP) and 2-hydroxymethyl-2-methyl-1,3-propanediol (HMP) and the like may be used as the temperature stabilizing means. When plastic crystals absorb thermal energy, the molecular structure is temporarily modified without changing the phase of the material.

In another aspect of the invention, the composition of the phase change material 40 may be modified to obtain optimum thermal properties for a given temperature range. For example, the melting point of a homologous series of paraffinic hydrocarbons is directly related to the number of carbon atoms as shown in the following table:

| Compound Name | Number of Carbon Atoms | Melting Point Degrees Centigrade |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Each of the above materials can be separately encapsulated and is most effective near the melting point indicated. It will be seen from the foregoing that the effective temperature of the coating can be tailored to a specific environment by selecting the phase change materials required for the corresponding temperature and adding microcapsules containing the material to the coating.

In fabricating the coating 10, the desired microencapsulated phase change materials are added to the polymer binder (liquid, solution or dispersion), compounded, cured, cross-linked or foamed to form a flexible layer on a substrate such as a fabric according to conventional coating methods. Typical concentrations of microencapsulated phase change material 30 added to the polymer binder range from about 30% to about 80% by weight. Embedding the microcapsules directly within the polymer binder 20 adds durability as the phase change material is protected by a dual wall, the first being the wall of the microcapsule and the second being the surrounding polymer matrix itself. Thus, the phase change material is less likely to leak from the coating during its liquid phase, thus enhancing its life and repeatability of thermal response.

The base material or substrate 50 can be an individual fiber, fabric (woven, knitted or non-woven) or non-fabric (molded objects). A significant element of the present invention is the continuous (webbed) or discontinuous (non-webbed) nature of the coating. Depending on fabric construction and viscosity of the coating medium, a discontinuously coated substrate 50 can be formed in which the individual elements of the substrate are each covered and not connected, as distinguished from a continuous coating in which the individual elements of the substrate 50 are connected by webbing of the coating matrix. Loose fabric construction coupled with a low viscosity coating medium yields the non-webbed structure, whereas tight fabric construction and high viscosity coating medium yields a coating with the webbed structure. In addition, individual fibers, FIGS. 4 and 5, can be coated before conversion into a product.

An important aspect of the present invention is its capability of imparting a thermal barrier effect to heat transfer for temperatures in the phase change range to coated fabric substrates. The significance of which derives from the capability of the present invention to store latent heat thereby limiting heat loss or heat gain. At the phase change temperature, a characteristic of the material during the heating cycle is to absorb and hold a quantity of thermal energy at almost constant temperature while changing to the next phase. The phase change material acts like "infinite" insulation when it is charging at the phase change point. It acts like an auxiliary heater when discharging at the phase change point. This action is transient, i.e., it will be effective until the total latent phase energy is either exhausted (on cooling) or absorbed (on heating). This function goes far beyond ordinary insulation which has no phase change mechanism. These heat storage and transfer properties do not suffer degradation in thermal performance when the coated fabric is compressed, as experienced by materials which solely depend upon insulative-trapped air for their barrier properties.

In another important aspect of the invention, clothing with thermal barrier properties can be fabricated from coated fabric substrates. The latent energy stored in the phase change material can be "recharged" by metabolic heat production during high activity levels, as well as by an external heat source applied prior to use. For example, a protective glove-liner can be made from a coated fabric. With the appropriate phase change material, the glove-liner can be adapted for cold weather use. The glove-liner can be heated prior to use to saturate the latent energy storage of the phase change material. It will remain warm for an extended period of time, with substantial cooling not occurring until the liquid phase change material has solidified, the length of time depending upon the metabolic activity of the user and the external temperature. Conversely, by selecting the appropriate phase change material, the glove-liner can be used to handle hot objects. In this instance, the phase change material is applied in the "cooled" state. When exposed to a hot environment, the user will remain comfortable until the phase change material has changed state.

Furthermore, the usefulness of the coating may be extended by using microcapsules containing two or more different phase change materials. Thus, by proper selection, a glove may be designed to protect the hand of the wearer when grasping hot objects and to similarly warm the hand of the user when out in a cold environment. It will be noted that this effect is reversible. The concept can be applied to items of clothing such as shoes, environmental suits, and numerous other applications which require protecting individuals or machinery from the hot or cold.

The foregoing embodiments and examples are to be considered illustrative, rather than restrictive of the invention, and those modifications which come within the meaning and equivalence of the claims are to be included therein.

That which is claimed is:

1. An article having enhanced thermal storage properties and repeatability of thermal response consisting essentially of:
   a base material selected from the group consisting of fabrics and fibers, and
   a coating covering at least a portion of the surface of said base material and comprising:
   a polymeric binder, and
   a plurality of microcapsules dispersed throughout and submerged within said binder on the surface of said base material so as to be surrounded thereby, said microcapsules containing a temperature stabilizing means selected from the group consisting of phase change materials and plastic crystals, whereby the article exhibits enhanced thermal stability when subjected to heat or cold.

2. An article having enhanced thermal storage properties according to claim 1 wherein said microcapsules are leak resistant, whereby the article may be subjected to repeated mechanical stresses with minimum changes in the thermal characteristics thereof.

3. An article with reversible enhanced thermal storage properties according to claim 1 wherein said temperature stabilizing means comprises a phase change material.

4. An article with reversible enhanced storage properties according to claim 1 wherein said temperature stabilizing means comprises a material selected from the group of paraffinic hydrocarbons.

5. An article with reversible enhanced thermal storage properties according to claim 1 wherein said temperature stabilizing means comprises a plastic crystal.

6. An article with reversible enhanced thermal storage properties according to claim 1 wherein said microcapsules range in diameter from about 0.5 to 1,000 microns.

7. An article with reversible enhanced thermal storage properties according to claim 1 wherein the coating includes at least two types of separately encapsulated temperature stabilizing means.

8. An article according to claim 1 wherein said binder is a polymer selected from the group consisting of polyurethene, nitrile rubber, chloroprene rubber, polyvinyl alcohol, silicone, ethylene/vinyl acetate copolymer, and acrylic.

9. The article according to claim 4 wherein the paraffinic hydrocarbon is selected from the group consisting of n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, and n-Tridecane.

10. The article according to claim 4 wherein the paraffinic hydrocarbon has a melting point between about $-5.5$ degrees Centigrade and about 61.4 degrees Centigrade.

11. A fabric consisting essentially of, in combination:
   (a) a base fabric substrate and
   (b) a flexible polymer directly coating and covering at least a portion of said substrate, a plurality of microcapsules dispersed throughout said coating so as to be covered and surrounded thereby, said microcapsules containing a temperature stabilizing means selected from the group consisting of phase change materials and plastic crystals and being positioned on the surface of said substrate, whereby the coated substrate exhibits enhanced thermal stability when subjected to heat or cold.

12. A fabric according to claim 11, wherein said substrate is a tightly woven fabric and said coating covers a portion of the outer surface of thereof forming a continuous layer.

13. A fabric according to claim 1, wherein said substrate is a loosely woven fabric composed of a plurality of individual fibers and wherein said coating covers the entire circumference of the individual fibers forming a discontinuous layer.

14. A fabric with reversible thermal storage properties according to claim 11 wherein said temperature stabilizing means comprises a phase change material.

15. The fabric according to claim 14 wherein the phase change material is selected from the group consisting of n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, and n-Tridecane.

16. The fabric according to claim 14 wherein the phase change material comprises a paraffinic hydrocarbon having a melting point between about $-5.5$ degrees Centigrade and about 61.4 degrees Centigrade.

* * * * *